United States Patent
Belcea (10) Patent No.: US 7,221,686 B1
(45) Date of Patent: May 22, 2007

(54) SYSTEM AND METHOD FOR COMPUTING THE SIGNAL PROPAGATION TIME AND THE CLOCK CORRECTION FOR MOBILE STATIONS IN A WIRELESS NETWORK

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 932 days.

(21) Appl. No.: 09/996,603

(22) Filed: Nov. 30, 2001

(51) Int. Cl.
*H04J 3/06* (2006.01)

(52) U.S. Cl. .................. 370/509; 370/503; 370/350

(58) Field of Classification Search ............... 370/503, 370/508, 509, 519, 252, 350, 253, 236, 249
See application file for complete search history.

(56) References Cited

U.S. PATENT DOCUMENTS

| | | | |
|---|---|---|---|
| 4,494,192 A | 1/1985 | Lew et al. .................. 364/200 |
| 4,617,656 A | 10/1986 | Kobayashi et al. ............ 370/74 |
| 4,736,371 A | 4/1988 | Tejima et al. .................. 370/95 |
| 4,742,357 A | 5/1988 | Rackley ....................... 342/457 |
| 4,747,130 A | 5/1988 | Ho .............................. 379/269 |
| 4,910,521 A | 3/1990 | Mellon ........................ 342/45 |
| 5,034,961 A | 7/1991 | Adams ........................ 375/130 |
| 5,068,916 A | 11/1991 | Harrison et al. ............... 455/39 |
| 5,231,634 A | 7/1993 | Giles et al. ................. 370/95.1 |
| 5,233,604 A | 8/1993 | Ahmadi et al. ............... 370/60 |
| 5,241,542 A | 8/1993 | Natarajan et al. .......... 370/95.3 |
| 5,317,566 A | 5/1994 | Joshi ........................... 370/60 |
| 5,392,450 A | 2/1995 | Nossen ...................... 455/12.1 |
| 5,408,506 A * | 4/1995 | Mincher et al. ............. 375/134 |

(Continued)

FOREIGN PATENT DOCUMENTS

CA 2132180 3/1996

(Continued)

OTHER PUBLICATIONS

Khoa To and James Sasitorn, N.A.M.E: The Network Time Protocol for Ad Hoc Mobile Environments, Rice University.*

(Continued)

*Primary Examiner*—Wing Chan
*Assistant Examiner*—Nguyen Ngo
(74) *Attorney, Agent, or Firm*—Randi L. Karpinia; Joseph J. Buczynski (57) ABSTRACT

A system and method for enabling a node, such as a mobile user terminal in a wireless communications network, such as an ad-hoc network, to effectively and efficiently determine a clock correction factor for its local clock relative to a local clock of at least one other node. The node calculates a difference between the timing of the local clock of the node and the local clock of the other node based on the timing of signals transmitted between the node and the other node, and information pertaining to the transmission and reception of these signals by the node and the other node as indicated by the respective local clocks of the node and the other node. The system and method further enables a plurality of nodes in an ad-hoc packet-switched communications network to calculate their respective local clock correction factors relative to the local clocks of their neighboring nodes in this manner with minimal message transmissions between the nodes, to reduce the amount of overhead in the network needed for such clock correcting operations.

16 Claims, 2 Drawing Sheets

U.S. PATENT DOCUMENTS

| | | | | |
|---|---|---|---|---|
| 5,412,654 | A | 5/1995 | Perkins | 370/94.1 |
| 5,424,747 | A | 6/1995 | Chazelas et al. | 342/70 |
| 5,502,722 | A | 3/1996 | Fulghum | 370/69.1 |
| 5,517,491 | A | 5/1996 | Nanni et al. | 370/29 |
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Woolley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/249 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,128,318 | A * | 10/2000 | Sato | 370/503 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,438,702 | B1 * | 8/2002 | Hodge | 713/400 |
| 6,754,235 | B2 * | 6/2004 | Van Der Putten et al. | 370/503 |
| 6,754,250 | B2 * | 6/2004 | Haartsen | 375/132 |
| 6,826,161 | B1 * | 11/2004 | Shahidi et al. | 370/331 |
| 6,836,851 | B2 * | 12/2004 | Dive | 713/400 |
| 7,072,432 | B2 * | 7/2006 | Belcea | 375/356 |
| 2001/0053699 | A1 | 12/2001 | McCrady et al. | 455/513 |
| 2002/0114303 | A1 * | 8/2002 | Crosbie et al. | 370/338 |
| 2002/0131370 | A1 * | 9/2002 | Chuah et al. | 370/252 |
| 2003/0048811 | A1 * | 3/2003 | Robie et al. | 370/509 |
| 2003/0142696 | A1 * | 7/2003 | Holmeide et al. | 370/508 |
| 2004/0093435 | A1 * | 5/2004 | Purho | 709/400 |
| 2005/0160272 | A1 * | 7/2005 | Teppler | 713/178 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1996 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Webster Ninth New College Dictionary. 1990, Merriam-Webster Incorporated, p. 601.*

Wong et al., "Soft Handoffs in CDMA Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing om Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

\* cited by examiner

SYSTEM AND METHOD FOR COMPUTING THE SIGNAL PROPAGATION TIME AND THE CLOCK CORRECTION FOR MOBILE STATIONS IN A WIRELESS NETWORK

BACKGROUND OF THE INVENTION

1. Field of the Invention

The present invention relates to a system and method for enabling a node, such as a mobile user terminal in a wireless communications network, to determine a clock correction factor for its local clock relative to a local clock of at least one other node, as well as a signal propagation time between the node and the other node, based on the timing of signals transmitted between the node and the other node, and clock information received from the other node, so that the node can use the clock correction factor when calculating its distance to the other node. More particularly, the present invention relates to a system and method for enabling nodes in an ad-hoc packet-switched communications network to calculate their respective local clock correction factors relative to the local clocks of their neighboring nodes with minimal message transmissions between the nodes, to reduce the amount of overhead in the network needed for such clock correcting operations.

2. Description of the Related Art

In recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

In ad-hoc wireless communications networks, it may be necessary or desirable for a mobile node to be capable of knowing or determining its geographic location. Some techniques determine the location of a mobile node based on the distances of the mobile node to other nodes in the network. These distances can be computed based on the propagation times of radio signals from the node to the other nodes. However, since each mobile node has a local clock that is not necessarily in synchronization with the local clocks running on other nodes in the network, the propagation times for signals propagating between the node and the other nodes cannot typically be measured directly.

Furthermore, in these types of ad-hoc networks, the nodes can communicate data packets with each other in a time division multiple access (TDMA) manner. Specifically, the nodes can transmit data packets during intervals referred to as time slices, which can be grouped in time frames as can be appreciated by one skilled in the art. However, differences in the local clock times of neighboring nodes can result in multiple nodes attempting to transmit data packets during the same time slice, which can result in collisions between the data packets and thus, data packets can possibly be lost. Also, although the local clocks of certain nodes may at one time be synchronized, a phenomenon known as clock drift can occur which can cause the local clock of a node to become unsynchronized with the local clocks of neighboring nodes.

For the reasons discussed above, it is therefore desirable for the local clocks of neighboring nodes in a network to know the amount by which the timing of their clocks differ each other, so that the nodes can apply the appropriate clock correction when determining the signal propagation times. However, in a large network having many nodes, it can be burdensome from both a time and bandwidth resource standpoint for a node to determine the appropriate clock corrections relative to the local clocks of all of its neighboring nodes.

Accordingly, a need exists for a system and method which enables a node in a communications network to determine the clock corrections for its local clock relative to the local clocks of all of its neighboring nodes without unduly burdening the network.

SUMMARY OF THE INVENTION

An object of the present invention is to enable a node, such as a mobile user terminal in a wireless communications network, to effectively and efficiently determine a clock correction factor for its local clock relative to a local clock of at least one other node, and well as the signal propagation time between itself and the other node.

Another object of the present invention relates to a system and method for enabling nodes in an ad-hoc packet-switched communications network to calculate their respective local clock correction factors relative to the local clocks of their neighboring nodes with minimal message transmissions between the nodes, to reduce the amount of overhead in the network needed for such clock correcting operations.

These and other objects are substantially achieved by providing a system and method for determining a relationship between the timing of a local clock of a node with respect to the timing of a local clock of at least one other node in a wireless communications network, such as an ad-hoc wireless communications network. The system and method include the operations of transmitting a clock information request message from the node to the other node at a request transmission time, and receiving at the node a response message from the other node at a response reception time, the response message including timing information pertaining to a request reception time at which the other node received the clock information request message and response transmission time at which the other node transmitted the response message. The request transmission time and the response reception time are indicated by the local clock of the node, and the request reception time and the response transmission time are indicated by the local clock of the other node. The system and method further perform the operation of calculating a difference between the timing of the local clock of the node and the local clock of the other node based on the timing information, the request transmission time and the response reception time.

The system and method further can perform the operation of calculating a propagation time for a signal to propagate between the node and the other node based on the timing information, the request transmission time and the response reception time. Furthermore, the system and method performs the transmitting, receiving and calculating steps to calculate a respective difference between the timing of the local clock of the node and a respective local clock of each of a plurality of the other nodes. In addition, the system and method can calculating respective differences between the timing of respective the local clocks of each of the plurality of other nodes and each other based on the difference between the respective differences between the timing of the local clock of the node and the respective local clocks of the plurality of other nodes.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
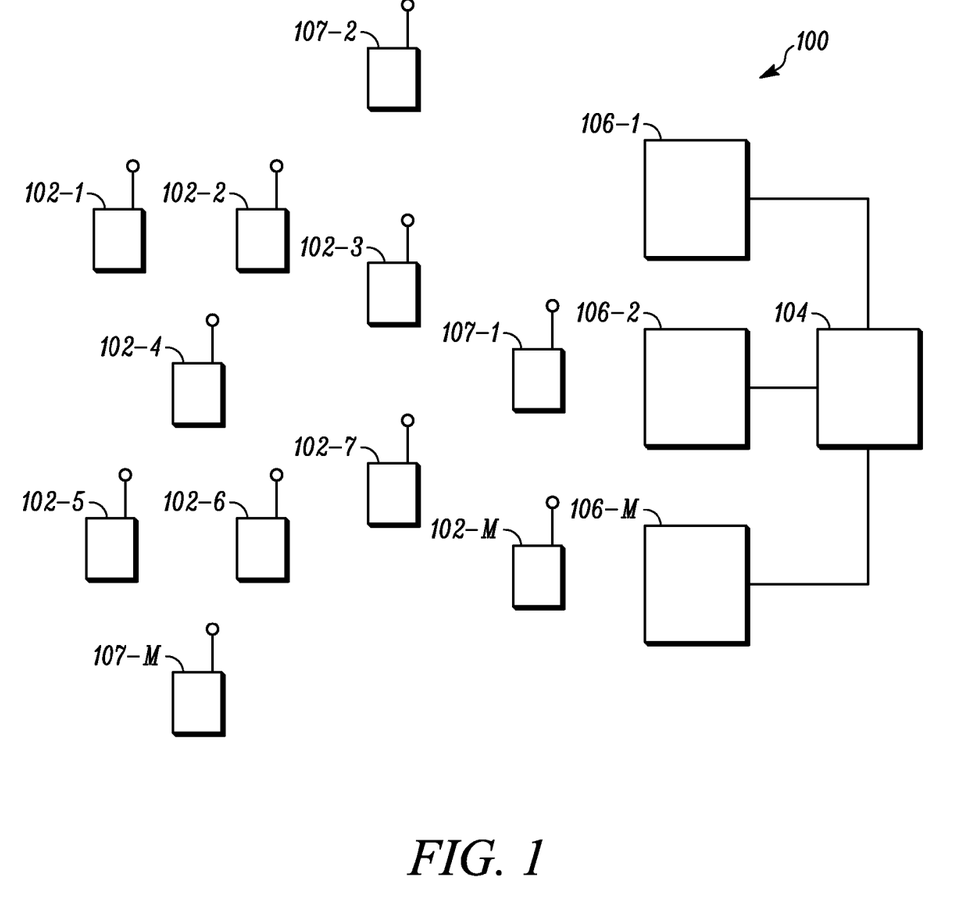
FIG. 1 is a block diagram of an example of an ad-hoc packet-switched wireless communications network employing a system and method for enabling a node, such as a mobile user terminal, in the network to determine respective clock correction factors for the timing of its local clock with respect to the timing of the local clocks of other nodes in the network, as well as respective signal propagation times between itself and the other nodes in the network, according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as user terminals 102), and a fixed network 104 having a plurality of intelligent access points (IAPs) 106-1, 106-2, ..., 106-n, for providing the user terminals 102 with access to the fixed network 104. The fixed network 104 includes, for example, a core local access network (LAN), and a plurality of servers and gateway routers, to thus provide the user terminals 102 with access to other networks, such as the public switched telephone network (PSTN) and the Internet.

The network 100 further includes fixed wireless routers 107-1 through 107-n, which act as routers for the user terminals 102-1 through 102-n and IAPs 106-1 through 106-n. The user terminals 102, IAPs 106 and fixed wireless routers 107 can be referred to as "nodes", with the user terminals 102 being referred to as "mobile nodes".

Figure 2:
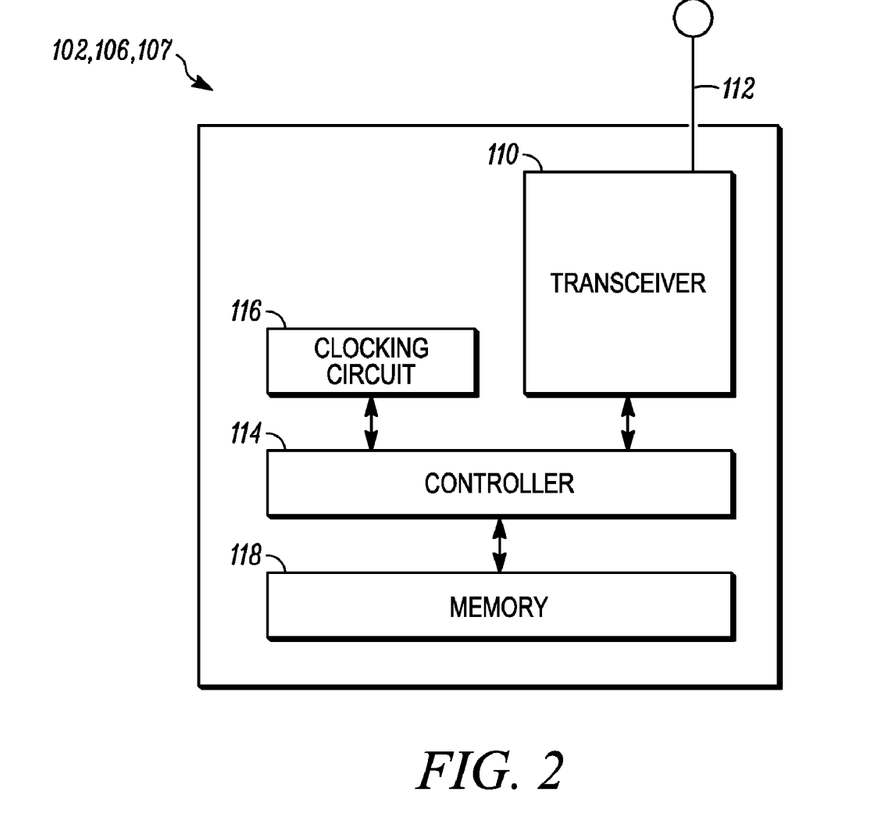
FIG. 2 is a block diagram illustrating an example of a mobile user terminal employed in the network shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, 106 or 107, as described in U.S. Pat. No. 5,943,322 to Mayor and in U.S. Pat. Nos. 7,072, 650, 6,807,165 and 6,873,839, referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107 under the control of a controller 112. The packetized data signals can include, for example, voice, data or multimedia.

Each node 102, 106 and 107 also includes a clocking circuit 116 connected to controller 114. The clocking circuit 116 operates as the local clock for the node, and provides a timing reference for the transmission and reception of signals by transceiver 110 as described in more detail below. It will be appreciated by those skilled in the art that although clocking circuit 116 is depicted as being separate from controller 114, the controller 114 can provide the timing for the arrival of messages received from node 102, 106 and 107.

Each node 102, 106 and 107 further includes a memory 118, such as a random access memory (RAM), that is capable of storing, among other things, routing information pertaining to itself and other nodes 102, 106 and 107 in the network 100. The nodes 102, 106 and 107 exchange their respective routing information, referred to as routing advertisements or routing table information, with each other via a broadcasting mechanism periodically, for example, when a new mobile node 102 enters the network 100, or when existing mobile nodes 102 in the network 100 move. A node 102, 106 and 107 will broadcast its routing table updates, and nearby nodes 102, 106 and 107 will only receive the broadcast routing table updates if within radio propagation range of the broadcasting node 102, 106 and 107.

As discussed in the Background section above, it may be necessary or desirable for a mobile node 102 to be capable of knowing or determining its geographic location. Some techniques determine the location of a mobile node 102 based on the distances of the mobile node 102 to other nodes 102, 106 and/or 107 in the network 100, which can be used to compute the Cartesian or geographical coordinates of the mobile node 102. These distances can be computed based on the propagation times of radio signals from the mobile node 102 to the other nodes 102, 106 and/or 107. An example of a technique that determines the location of a mobile node in this manner is described in U.S. Pat. No. 6,768,730 of Eric A. Whitehill entitled "A System and Method for Efficiently Performing Two-Way Ranging to Determine the Location of a Wireless Node in a Communications Network", issued on Jul. 27, 2004, and in U.S. Pat. Nos. 6,876,326 and 6,486,831, the entire contents of each of these applications being incorporated herein by reference.

Figure 3:
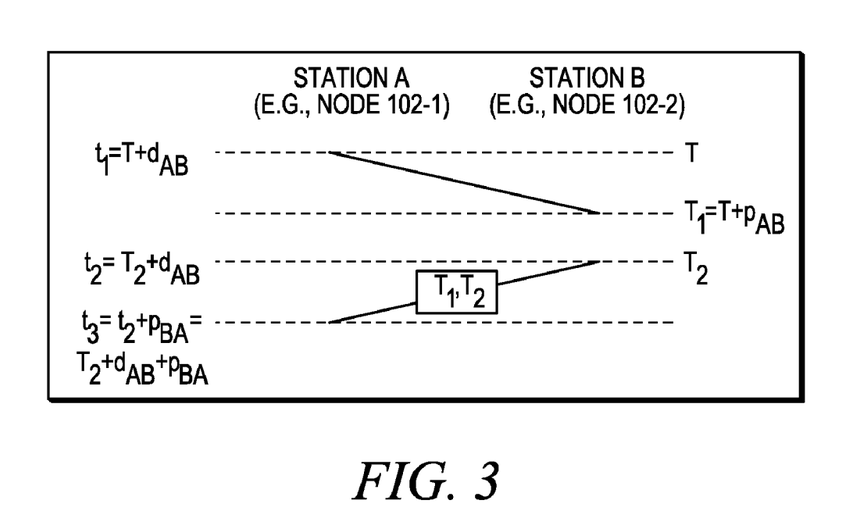
FIG. 3 is a timing diagram illustrating exemplary message exchanges between two nodes in the network shown in FIG. 1 according to an embodiment of the present invention.

An example of the manner in which a mobile node 102 can determine the signal propagation time between itself an another node 102, 106 or 107 in the network, as well as the appropriate clock correction for its local clock relative to the local clock of that other node, in accordance with an embodiment of the present invention will now be described with reference to FIGS. 1–3. FIG. 3 is a timing diagram illustrating exemplary message exchanges between two mobile nodes 102, identified generally as "Station A" and "Station B", according to an embodiment of the present invention.

As indicated, Station A (e.g., mobile node 102-1) communicates a message requesting clock information to Station B. Because the local clocks of Station A and Station B are not synchronized, the local clock of Station A indicates that the message was transmitted at time $t_1$, while the local clock of Station B indicates that the message was transmitted at time T. The relationship between $t_1$ and T is described in the following equation:

$$t_1 = T + d_{AB}$$

with $d_{AB}$ representing the difference in seconds between the local clock of Station A and the local clock of Station B.

Station B receives the message at time $T_1$ which can be defined by the following equation:

$$T_1 = T + p_{AB}$$

where $p_{AB}$ is the propagation time for the message to travel between Station A and Station B.

Station B then transmits a response message to Station A when the local clock of Station B indicates time $T_2$. The response message contains information representing the time $T_1$ when the message transmitted by Station A was received by Station B, and information representing the time $T_2$ when the response message was transmitted. It is noted that when the local clock of Station B indicates time $T_2$, the local clock of Station A indicates time $t_2$, which can be represented by the following equation:

$$t_2 = T_2 + d_{AB}$$

where $d_{AB}$ is the difference in seconds between the local clock of Station A and the local clock of Station B.

The response message is then received at Station A at time period $t_3$. The following equation describes the relationship between the previous time periods and $t_3$:

$$t_3 = t_2 + p_{BA} = T_2 + d_{AB} + p_{BA}$$

where $p_{BA}$ is the propagation time for the response message to travel from Station B to Station A. It can be assumed that if Station B responds to message from Station A within a very short time, preferably only a few microseconds, the propagation time between Station A and Station B is the same in both directions. Accordingly, since the propagation times $p_{AB} = p_{BA}$, they can be represented as propagation time p. The equations for $t_1$, $t_3$, and $T_1$ can therefore be represented as follows:

$$t_1 = T + d_{AB}$$

$$t_3 = T_2 + d_{AB} + p$$

$$T_1 = T + p$$

Subtracting the $T_1$ equation from the $t_1$ equation, and subtracting $T_2$ from the $t_3$ equation results in:

$$t_1 - T_1 = (T+d) - (T+p) = d_{AB} - p$$

$$t_3 - T_2 = T_2 + d + p - T_2 = d_{AB} + p$$

to thus result in a clock difference represented by the following equation:

$$d_{AB} = \frac{(t_3 - T_2) + (t_1 - T_1)}{2}$$

and the signal propagation time for a signal propagating from Station A to Station B or vice-versa represented by the following equation:

$$p = \frac{(t_3 - T_2) - (t_1 - T_1)}{2}$$

This calculated clock difference and signal propagation time can then be taken into account by the controller 114 of Station A (e.g., mobile node 102-1) when the controller calculates the distance between Station A and Station B (e.g., mobile node 102-2). Specifically, the controller 114 can apply the appropriate clock correction to the local clock of Station A based on the calculated clock difference when calculating the distance between Stations A and B. The controller 114 of Station A can also use calculated clock difference $d_{AB}$ to synchronize its local clock 116 with the local clock of Station B, if desired.

It should be also noted that movement of the mobile stations 102 (Station A or Station B) can affect the signal propagation time of a signal propagating from Station A to Station B or vice-versa. That is, when at least one of the two stations is mobile, the distance between Stations A and B and the signal propagation time changes continuously. However, the clock difference $d_{AB}$ calculated in accordance with the above equation can be used to calculate the correct propagation time. For example, if Station A (e.g., node 102-1) receives a timed message from Station B (e.g., node 102-2) at time $t_n$. Throughout this specification, the term "timed message" refers to a message carrying information about the time when it was transmitted. This information can be contained explicitly, that is, information within the message itself, or implicitly as described in more detail below. Accordingly, in this example, the timed message transmitted by Station B contains information representing the time $T_n$ that the message was sent from Station B. The propagation time $p_n$ between the Stations A and B for that message can therefore be calculated as follows:

$$p_n = t_n - T_n + d_{AB}$$

It will be appreciated by those skilled in the art that although the technique according to an embodiment of the present invention is discussed above with regard to two nodes mobile nodes 102 (Stations A and B), the technique can be applied to essentially an unlimited number of mobile nodes 102 in the network 100. For instance, mobile node 102-1 can determine its clock correction relative to all of its neighboring mobile nodes 102, as well as its neighboring IAPs 106 and fixed routers 107. The neighboring mobile nodes 102 (as well as the neighboring IAPs 106 and fixed routers 107) will, in turn, determine their own clock correction with respect to their neighboring nodes, and so on.

For example, using the technique described above, Station A (e.g., node 102-1) can find its clock correction relative to all n neighbors: $d_1$, $d_2$, . . . $d_n$ (e.g., nodes 102-2, 102-3, 106-1, 107-1 and so on). Once the clock correction to a neighbor is identified, the propagation time of radio signals to any neighbor can be computed from any timed messages that is received, regardless the destination of the message, that is, regardless of whether the message is destined for node 102-1 itself, or to another node. That is, as can be appreciated by one skilled in the art of ad-hoc networks, in a neighborhood of n stations, when station $S_1$ sends a message to station $S_2$, all other n–2 stations receive the message. The controllers of these other stations examine the routing information inside the message. In doing so, if the controllers determine that the message is for another station (e.g., Station $S_2$), the controllers can instruct their respective station to drop the message without further action. On the other hand, since the message was sent to Station $S_2$, when Station $S_2$ receives the message, its controller examines the routing information in the message. If $S_2$ is the final destination of the data contained in the message, data is transferred to the proper application running on Station $S_2$. However, if $S_2$ is not the final destination of the data, the controller of $S_2$ examines the routing table stored in the memory of Station $S_2$ and retransmits data to the next node while adding to the proper routing information to the message. Accordingly, each received message, even if addressed to some other station, is used for evaluating the propagation time. It should also be noted that this procedure for computing the clock relative correction must be repeated periodically to compensate for individual clock slip of local clocks of the nodes.

The following describes a manner in which a plurality of nodes (e.g., nodes 102, 106 or 107) can use the technique described above to calculate the relative clock corrections between each other. For example, it can be assumed that n stations $S_i$, i=1, 2, . . . , n need to establish the clock relative corrections $d_{i,j}$ between them. Each station thus need to have n−1 corrections in order to account for all of its neighbors. According to one technique, in a neighborhood of n stations, each station would need to exchange two messages with all of its n−1 neighbors. That is, as shown in FIG. 3, each station would need to send a respective clock information request message to each of its neighbors and receive a respective response message from each of its neighbors. The total number of messages being exchanged could thus be represented by the equation 2n(n−1). Hence, for a neighborhood of 50 stations, the total number of messages would be 4900.

However, it should be noted that because the clock correction is the algebraic difference between the readings of two clocks, the relative clock correction for stations is transitive, or in other words, the clock difference between Stations A and B, represented as $d_{AB}$, is equal to the clock difference between Stations A and C, represented as $d_{AC}$ summed with the clock difference between Stations C and B, represented as $d_{CB}$. This can be represented by the following equation:

$$d_{AB}=d_{AC}+d_{CB}$$

Also, the relative clock correction is asymmetrical, as represented by the following equation:

$$d_{AB}=-d_{BA}$$

From these properties, the following equations can be derived:

$$d_{CB}=d_{AB}-d_{AC}$$

$$d_{CA}=-d_{AC}$$

These equations therefore indicate that Station C can compute its clock correction relative to Stations A and B if it knows the relative clock correction of Station A to its neighbors. Accordingly, when station $S_1$ acts as Station A in FIG. 3 and broadcasts the message requesting a clock response, all other n−1 neighboring stations will act as Station B and will transmit response messages to Station $S_1$. That is, each response message will include information representing the respective time that the respective station received the message from Station $S_1$ and the respective time that the respective station transmitted the response to Station $S_1$. For example, the response message from a Station B ($S_2$, . . . , $S_n$) will include information indicating the times (according to the clock of Station B) that Station B received the message from Station A ($S_1$) and transmitted the response to Station A. Likewise, the response message from any other station $S_2$, . . . , $S_n$ will include information indicating the times (according to the clock of each station) that each station received the message from Station $S_1$ and transmitted the response to Station $S_1$, and so on.

Based on these response messages, Station $S_1$ can compute its clock relative corrections to each station $S_2$, . . . , $S_n$ in its neighborhood, and then broadcast n−1 messages containing these corrections. Using the transitivity and asymmetry properties, each station in the neighborhood that receives the broadcasted messages can compute its own clock corrections relative to all other neighbors. In this case, the total number of transmitted messages is reduced to 2n−1 or only 99 messages for the 50-station neighborhood, that is, 1 clock request messages transmitted by Station $S_1$, n−1 response messages received from its neighbors, and n−1 broadcast messages of its respective clock corrections relative to each of its neighbors.

Hence, using the techniques according to an embodiment of the present invention as demonstrated above, very little overhead is needed in terms of signal transmission to be able to fully correct the clocks of a neighborhood of nodes. Also, although the number of messages can ideally be as small as the number represented by the above equation, in reality, a larger number of messages may need to be transmitted due to message collisions, transmission errors and the like.

It can also be appreciated from the above description, as well as FIG. 3, that timed messages must contain information representing the time when they were transmitted. Accordingly, the size of the message has to be increased by adding a field that contains information representing the clock reading of the station's local clock at transmission time. Depending on desired precision, the time field can have many bits, which can cause the duration needed for transmitting the message to be extended, thus decreasing the network capacity. In order to avoid this situation, the clock information can be compressed in many ways. Actually, only the response message (e.g. transmitted by Station B in FIG. 3) responding the request for clock data has to contain the full value of the clock (i.e., the value of the local clock of Station B). All other messages not related to the clock adjustment can be timed implicitly, without transmitting any extra information or by transmitting very little data, as will now be described.

One method to broadcast implicitly timed messages is to use a time division for scheduling the transmissions. It should be also noted that in this method, the controller 114 of any node 102, 106 or 107 controls the modem of transceiver 110 to start transmitting messages only at particular interval of time (i.e., a time-slice) to achieve the TDMA transmission. The receiving station (node) measures the arriving time of any received message, applies the relative clock correction associated with the station (node) transmitting the message and the previous propagation, and what remains, either positive or negative, is limited to the size of half the time-slice and is used for correcting the propagation time of the signal propagating from the transmitting node to the receiving node.

For example, assuming that there are only two Stations A and B, and they are controlled such that they send messages only at the beginning of a time slice. The initial propagation time and the clock correction are identified using the technique according to the embodiment of the invention discussed above and as shown in FIG. 3. Every time Station B sends any timed message to any other station within Station A's neighborhood, Station A can receive this message, and its controller records the message receiving time. Using the clock correction and the previously measured propagation in the technique discussed above, Station A can compute the approximate time that the clock at Station B was reading when Station B transmitted the message. If the distance between two stations did not change since previous message, the approximate time corresponds exactly to the beginning of a time slice. However, if the distance between stations A and B has changed, the approximated time does not exactly correspond to the beginning of a time slice.

Nevertheless, by knowing that Station B sent the message when the reading of its clock corresponded to the beginning of a time slice, the change in propagation time can be determined as the difference between the approximate transmission time and the closest beginning of a time slice. The difference could have a negative or positive value. Also, since the difference relates to the closest beginning of a time slice, it is necessary that the correction is smaller than half of a time slice to allow the correct time slice to be chosen. The difference can then be used as a correction to the propagation time for the message to travel from Station B to Station A.

Specifically, the correction to propagation time is equal to the change of distance between stations in meters divided by the speed of light ($2.99792458 \cdot 10^8$ m/s). The change in distance between stations from one transmission to another measured in meters is v/n, with v being in m/s because there are n transmissions every second. If the value of v is measured in Km/h, the equation v/n becomes v/(3.6*n). Because the time slice Ts must be at least twice the size of the propagation time correction the size of the time-slice must verify the equation:

$$Ts > \frac{v}{1.8 * n * 2.99792458 \cdot 10^8}$$

where v is the maximum relative speed between stations in Km/h, and n is the minimum number of messages a station transmits every second. Using this method, if a neighbor transmits a smaller number of messages per second than n, it has to initiate the clock synchronization process or has to broadcast dummy messages for maintaining the correction of the propagation time at a smaller value than ½ Ts. That is, the size of the time slice and the number of messages per second are defined before the system is implemented. If, during operation, a station does not transmit a large enough number of messages, in order to provide correct propagation range to its neighbors, the station needs to broadcast messages with no real content. In other words, the purpose of these messages is to keep the neighboring stations informed about the station's position and to prevent an accumulation of distance change between the station and its neighbors to occur which could cause the neighboring stations to lose count of one or many full time slices.

In addition, as discussed above, explicitly timed messages include information about their transmission time in the transmitted message itself. To reduce the amount of data representing this information and thus, to reduce the overall length of the explicitly timed messages, each transmitted timed message contains a field that specifies the number of the time-slice used when the transmission was started. As can also be appreciated by one skilled in the art, a number of time-slices can be grouped in a time-frame. The size of the time-slice and the number of time slices per time-frame are dependent on transceiver throughput.

The transceiver 110 (see FIG. 2) starts transmitting the message at the beginning of a time-slice. The transceiver 110 can be configured to fill in the message with the time slice number automatically. This technique is applicable when the relative speed between stations is extremely high.

When the message is received, the relative clock correction is applied, the number of time slice multiplied with the time slice size and the previous propagation time are then subtracted. The remainder is limited to the size of one half time-frame and is applied as correction to the propagation time.

The size of the time-slice and the number of time-slices per time-frame can be optimized based on transceiver throughput. The optimization goal is to minimize the message transmission duration. For example, the optimal configuration for a 6 Mbps transceiver has four time-slices of 250 ns combined in a 1 microsecond time-frame. In this example, the timing information added to all messages is a two bit data that specifies the number of the time-slice within the time-frame (i.e., a number between 0 and 3). With this method, the duration of all messages is increased with an average of 458 ns.

It is further noted that the techniques described above for determining the clock correction for the nodes 102, 106 and 107 should be performed periodically depending on the quality of the local clocks of the nodes, which can be indicated by the degree of clock drift, and on the size of the acceptable error. For example, for a $10^{-9}$ clock drift (drifting one nanosecond every second), in order to have a measuring error smaller than 10 meters for a node (e.g., a mobile node 102) calculating its distance to another node, the clock correcting technique must be repeated at least every 30 seconds. Also, systems using low accuracy clocks should use methods for predicting and correcting the drift of clock relative corrections in order to improve their accuracy.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining a relationship between the timing of a local clock of a node with respect to the timing of a local clock of at least one other node in a wireless communications network, comprising:

transmitting a clock information request message from said node to said other node at a request transmission time;

receiving at said node a response message from said other node at a response reception time, said response message including timing information pertaining to a request reception time at which said other node received said clock information request message and response transmission time at which said other node transmitted said response message; and calculating a difference between the timing of said local clock of said node and said local clock of said other node based on said timing information, said request transmission time and said response reception time, controlling said other node to transmit a subsequent signal at a beginning of a time slice;

receiving said subsequent signal at said node;

calculating a subsequent transmission time at which said local clock of said other node was reading when said other node transmitted said subsequent signal based on said calculated difference between the timing of said local clock of said node and said local clock of said other node; and comparing said subsequent transmission time to a time representing a beginning of a time slice to determine a propagation time for said subsequent signal to propagate between said other node and said node.

2. A method as claimed in claim 1, further comprising after said calculating said difference step:

calculating a first propagation time for a signal to propagate between said node and said other node based on said timing information, said request transmission time and said response reception time.

3. A method as claimed in claim 1, wherein:

said request transmission time and said response reception time are indicated by said local clock of said node, and said request reception time and said response transmission time are indicated by said local clock of said other node.

4. A method as claimed in claim 1, wherein:

said method performs said transmitting, receiving and calculating steps to calculate a respective said difference between the timing of said local clock of said node and a respective said local clock of each of a plurality of said other nodes.

5. A method as claimed in claim 4, further comprising:

calculating respective said differences between the timing of respective said local clocks of each of said plurality of other nodes and each other based on said difference between said respective differences between the timing of said local clock of said node and said respective local clocks of said plurality of other nodes.

6. A method as claimed in claim 1, wherein:

said network includes an ad-hoc multihopping communications network, and said node and said other node operate within said ad-hoc multihopping communications network.

7. A method as claimed in claim 1, wherein:
said node is a mobile node.

8. A method as claimed in claim 1, wherein:
said other node is a mobile node.

9. A system for determining a relationship between the timing of a local clock of a node with respect to the timing of a local clock of at least one other node in a wireless communications network, said system comprising:

a transmitter, for transmitting a clock information request message from said node to said other node at a request transmission time;

a receiver, for receiving at said node a response message from said other node at a response reception time, said response message including timing information pertaining to a request reception time at which said other node received said clock information request message and response transmission time at which said other node transmitted said response message; and a processor, for calculating a difference between the timing of said local clock of said node and said local clock of said other node based on said timing information, said request transmission time and said response reception time, a controller, for controlling said other node to transmit a subsequent signal at a beginning of a time slice; and wherein:

said receiver receives said subsequent signal at said node; and said processor calculates a subsequent transmission time at which said local clock of said other node was reading when said other node transmitted said subsequent signal based on said calculated difference between the timing of said local clock of said node and said local clock of said other node, and compares said subsequent transmission time to a time representing a beginning of a time slice to determine a propagation time for said subsequent signal to propagate between said other node and said node.

10. A system as claimed in claim 9, wherein:

said processor further calculates a first propagation time for a signal to propagate between said node and said other node based on said timing information, said request transmission time and said response reception time.

11. A system as claimed in claim 9, wherein:

said request transmission time and said response reception time are indicated by said local clock of said node, and said request reception time and said response transmission time are indicated by said local clock of said other node.

12. A system as claimed in claim 9, wherein:

said transmitter, receiver and processor perform said transmitting, receiving and calculating, respectively, to calculate a respective said difference between the timing of said local clock of said node and a respective said local clock of each of a plurality of said other nodes.

13. A system as claimed in claim 12, wherein:

said processor further calculates respective said differences between the timing of respective said local clocks of each of said plurality of other nodes and each other based on said difference between said respective differences between the timing of said local clock of said node and said respective local clocks of said plurality of other nodes.

14. A system as claimed in claim 9, wherein:

said network includes an ad-hoc multihopping communications network, and said node and said other nodes operate within said ad-hoc multihopping communications network.

15. A system as claimed in claim 9, wherein:
said node is a mobile node.

16. A system as claimed in claim 9, wherein:
said other node is a mobile node.

* * * * *